A. C. MASON & A. T. STURT.
STEERING GEAR.
APPLICATION FILED DEC. 14, 1914.
1,171,131.
Patented Feb. 8, 1916.
2 SHEETS—SHEET 1.
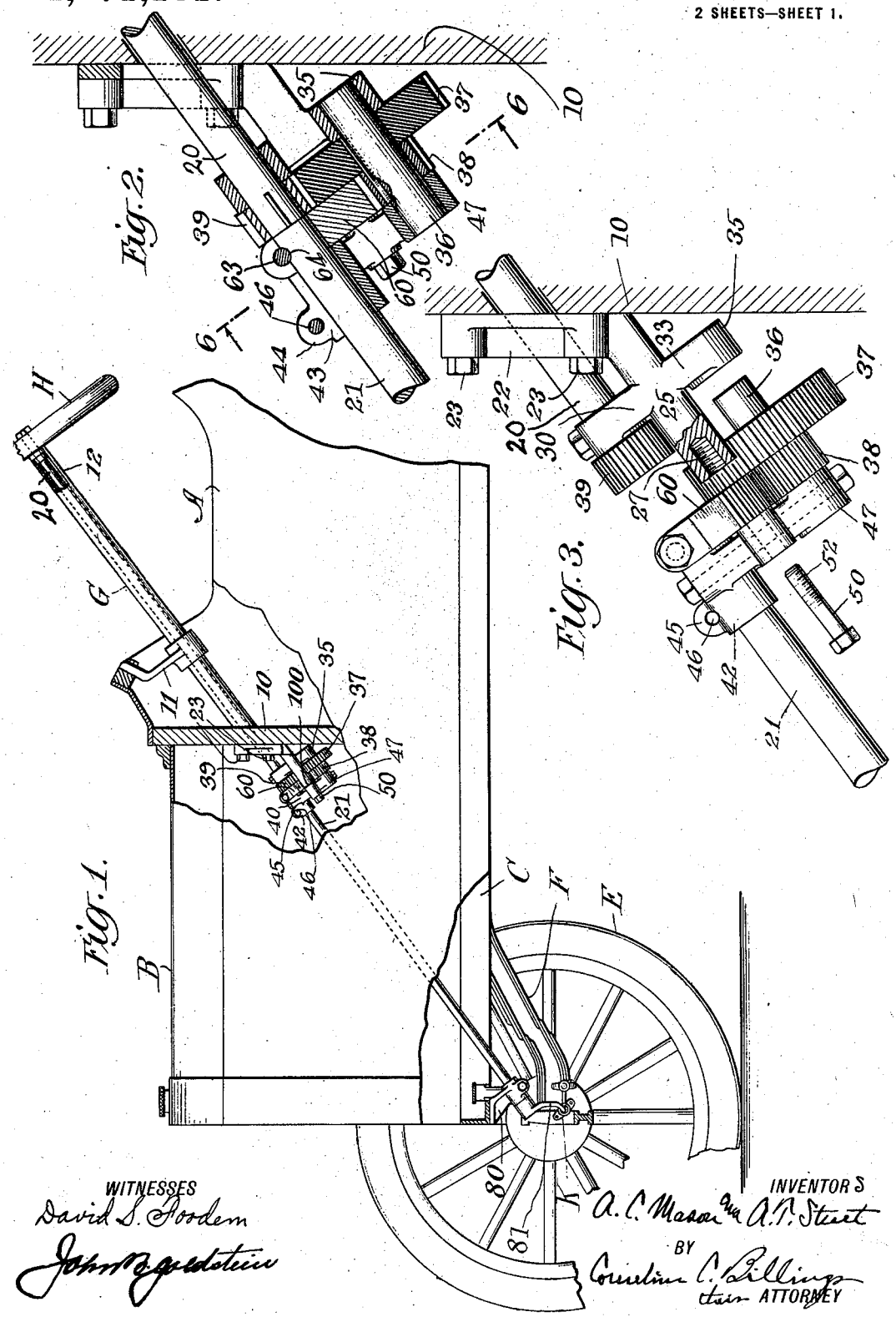

A. C. MASON & A. T. STURT.
STEERING GEAR.
APPLICATION FILED DEC. 14, 1914.
1,171,131. Patented Feb. 8, 1916.
2 SHEETS—SHEET 2.
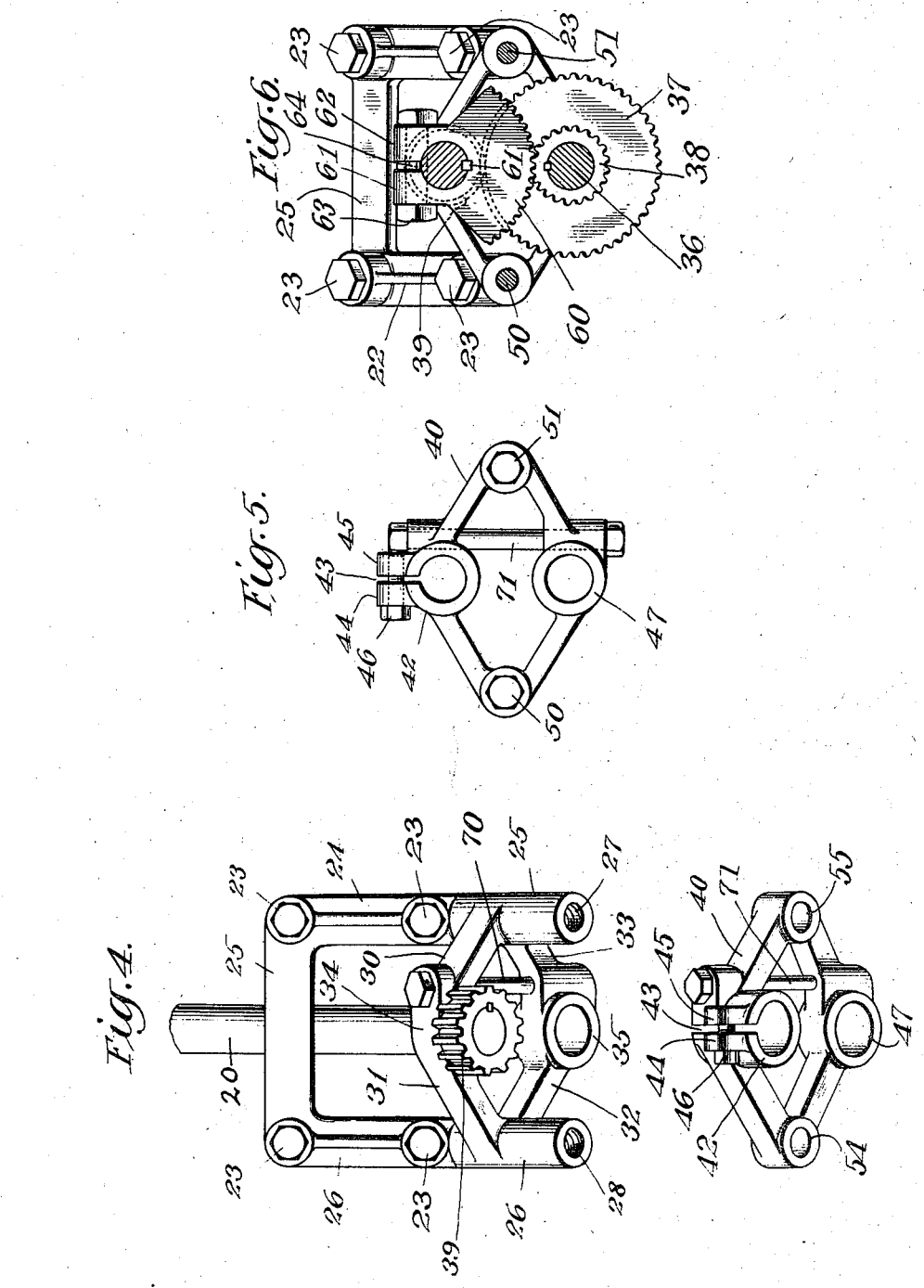

UNITED STATES PATENT OFFICE.

ARTHUR C. MASON AND ALFRED T. STURT, OF FLINT, MICHIGAN, ASSIGNORS TO CHEVROLET MOTOR COMPANY OF NEW YORK, INC., OF NEW YORK, N. Y., A CORPORATION OF NEW YORK.

STEERING-GEAR.

1,171,131.  Specification of Letters Patent.  Patented Feb. 8, 1916.

Application filed December 14, 1914. Serial No. 877,007.

*To all whom it may concern:*

Be it known that we, ARTHUR C. MASON and ALFRED T. STURT, citizens of the United States of America, and residents of the city of Flint, county of Genesee, and State of Michigan, have jointly invented certain new and useful Improvements in Steering-Gear; and we do hereby declare the following to be a full, clear, and exact description thereof.
This invention relates to steering gear especially adapted for use in automobile construction.

One of the objects of this invention is to provide a steering gear formed of two separate and independent parts which may be readily coupled together and uncoupled.

Another object is to produce a construction of gearing which is easy to adjust in order to take up wear upon the co-acting parts and prevent lost motion.

Other objects will appear from the subjoined description and claims.

The invention therefore consists in a steering gear in which the steering column is in two parts operatively connected together by multiple gearing and so mounted as to be readily connected and disconnected one from the other when desired, either for the purpose of repair or for the purpose of dismantling the automobile.

The invention further consists in the construction, arrangement and combination of parts as hereinafter more fully described and claimed.

Referring to the drawings; Figure 1., is a side elevation of the front of a conventional automobile structure, partly in section showing our invention attached to the steering column. Fig. 2., is a vertical section through the gearing and supporting cage or frame within which the gearing is mounted. Fig. 3., is a side elevation partly in section showing the two portions of the steering column separated from each other, but in juxtaposition to each other with the supporting cage and gear wheels in place. Fig. 4., is a front view of one portion of the supporting cage or frame within which the gearing and shafts are mounted; the other portion of the supporting cage being shown in perspective. Fig. 5., is a front elevation of one portion of the supporting cage or frame. Fig. 6., represents a vertical section on line 6—6 of Fig. 2.

In the drawings, similar reference characters indicate like parts.

A is an automobile body, B the radiator casing, C the frame, D the front axle, E a wheel, F the supporting springs, G the steering column and H the steering handle, and K the lever mechanism operatively connected to the wheels.

10 is the dash board; 11 a bracket attached to the dash board to support the upper end of the steering columns; 12 is the tube of ordinary construction, through which the upper portion of the steering rod passes. The steering rod is made in two parts 20 and 21. A frame 22 is secured to the front of the dash board by bolts 23 passing through the corners of a rectangular portion thereof indicated at 24, 25 and 26. From the lower corners of this rectangular portion extend rigid projections 25 and 26 in which are threaded bolt-holes 27 and 28. From these projections extending in upwardly and downwardly directions are rigid arms 30, 31, 32 and 33 forming a diamond shaped frame, in the upper portion of which is a longitudinal bearing 34 to receive the lower end of the shaft 20. In the lower portion of the diamond frame is a longitudinal bearing 35 to receive an idler shaft 36 to which is keyed gear wheels 37 and 38. These wheels 37 and 38 are preferably separated, but it is obvious that they may be integral with each other. Keyed to the end of the upper shaft 20 which projects through the frame is a gear wheel 39.

A diamond shaped frame 40 is mounted upon the separate lower portion 21 of the steering column and this frame is supported at its upper corner by the lower shaft 21 passing through a bearing 42 therein. This bearing is split longitudinally at 43 and is provided with upwardly extending flanges 44 and 45 through which a bolt 46 passes by means of which it is clamped to the shaft. This bearing is of substantial length and is adjustable upon the shaft to take up wear. In the opposite corner of the diamond shaped frame 40 is a bearing 47 to receive the other end of the idler shaft 36 to which the gears 37 and 38 are keyed as above described. Bolts 50 and 51 screw-threaded at their ends at 52 (see Fig. 3.,) pass through holes 54 and 55 in the outer corners of the frame 40 by means of which construction the frame 40 is secured to the frame 22. At the upper end of the shaft 21 which is in juxtaposition to or is adjacent with the lower end of the shaft 20, is mounted a toothed sector 60 which is keyed at 61 to the shaft 21 outside of the upper portion of the lower frame 40. The geared sector 60 is split at its upper side and has two flanges or arms 61 and 62 extending upwardly therefrom through which the bolt 63 is passed and by means of which the geared sector 60 is rigidly clamped to the shaft 21. We preferably cut a kerf 64 in the upper part of the shaft 21 into which the bolt 63 rests in order to hold the sector from sliding downwardly upon the shaft when the gear is assembled. In each of the diamond frames we mount bolts 70 and 71 running across the same, and bridging the parts by means of which we adjust the frames in order to cause the gears which are mounted therein to engage each other more effectually, and prevent lost motion when in operation.

The train of multiple gearing consists of a driving or power gear, a driven gear and two idler or transmission gears, and it is so arranged that the driven shaft is given a slow movement, its extent of movement, being easily governed by the manipulation of the steering handle on the driving or power shaft.

The train consists or a gear of small diameter on the power or driving shaft, meshing with a larger idler or transmission gear, secured to an idler shaft arranged parallel thereto. A small gear substantially equal in size to the driving gear is also secured to the idler shaft, and said gear meshes with a toothed sector secured to the driven shaft, the radius of which is equal to the radius of the larger idler or transmission gear, and its axis is in line with the axis of the power or driving gear.

At the forward and lower part of the carriage supporting frame, we mount a bearing 80 through which the lower portion of the shaft 21 is mounted. An oil cup 82 may be provided in a suitable position. At the end of the shaft 21 is rigidly secured an operating arm 81 which engages the usual rods and levers which operate the forward wheels by connecting the said levers to the usual king bolts which are operatively connected to the wheels.

In assembling the steering gear, the upper cage or frame is first bolted to the front of the dash board and the upper end of the lower shaft 21 which passes therethrough is alined with the lower end of the upper shaft 20 abutting each other at 100 (Figs. 1 and 2,), the upper shaft having at its lower end suitably keyed thereto the gear 39 and the geared sector being suitably keyed to the upper end of the lower shaft 21. The lower diamond shaped frame which is mounted at first on the lower shaft is then bolted to the upper frame 22 as above described by means of the bolts 50, the idler shaft 36 to which the gears 37 and 38 are fixed, being so alined that each of its ends will be inserted respectively in the bearings 35 and 47, and the parts are then properly adjusted by means of the bolts 46, 63, 70 and 71. In operation by the turning of the steering handle in the usual way, the upper shaft 21 will turn, causing the gear 39 which is fixed thereto and which meshes with the gear 37 to turn the latter as the gear 37 is keyed to the idler shaft 36. This movement will cause the shaft 36 to turn which causes the gear 38 which is also keyed thereto to turn; as the said gear 38 meshes with the teeth of the sector 60, the latter is caused to turn, and the sector being keyed to the shaft 21 causes that shaft to turn thereby causing the lever 81 which is fixedly secured at its lower end to vibrate or rock to and fro, according to the direction in which the steering handle is turned. As the lever is coöperatively connected to a series of rods and levers attached to the king bolts which are coöperatively connected to the front wheels in the usual way, the front wheels are turned in any direction desired in order to steer the car, and cause it to be guided in any desired direction.

The supporting frames for the gearing are made of brass or bronze or of any suitable material. As will be evident from the above description, our gearing is very simple in construction, very easy to assemble, very true in its operation and is easy of adjustment in order to cause the gears to efficiently engage themselves one with the other and efficiently provide against lost motion. As the operating surfaces of the gears are very limited, it is evident that the gears may be adjusted in position on their respective shafts so that the new portions of the gear wheels may be brought in juxtaposition to each other for further use in case the teeth as a result of wear cause lost motion during the operation.

While we have shown certain features of our invention in the accompanying drawings, it is to be understood that said drawings are merely illustrative, and that we are not specifically confined to what is there shown and herein described in connection therewith, except as may set forth in the claims.

Having now described our invention, what we claim as new and desire to secure by Letters Patent, is:—

1. In a steering gear for automobiles, a support, a cage or frame fixedly mounted on said support, at one side thereof and inclined with reference thereto, an upper shaft mounted in said cage or frame, a second frame removably mounted on said first frame, a lower shaft mounted in the second frame, each of said shafts having a gear secured thereto, an idler shaft mounted in said frames, gears fixed to said idler shaft, said gears operatively engaging with the gears on the upper and lower shafts.

2. In a steering gear for automobiles, a support, a cage or frame fixedly mounted on said support, at one side thereof and inclined with reference thereto said frame being provided with rigid projections, an upper shaft mounted in said cage or frame, a second frame removably secured to the free ends of the projection aforesaid, a lower shaft mounted in the second frame, each of said shafts having a gear secured thereto, an idler shaft mounted in said frames, gears fixed to said idler shaft, said gears operatively engaging with the gears on the upper and lower shafts, a steering wheel secured to the upper shaft as and for the purpose described.

3. In a steering gear for automobiles, the combination with the dash board, of a support secured to the front side thereof, a frame carried by said support and arranged at an angle thereof, a shaft mounted on said frame and extending through the dash board, the said shaft being provided with an operating handle at one of its ends and a gear at the other end, a second shaft arranged in line with said first mentioned shaft and having a gear secured thereto at its upper end and an operating lever arm secured to its lower end, the lower and upper ends of each of the two shafts being held together in the said supporting frame, idler gears fixed to a common shaft mounted in said supporting frame and arranged to engage respectively with the gears mounted upon the steering shaft.

4. In a steering gear for automobiles, a two part cage or frame, a support therefor arranged in an inclined position with reference to said frame and whereby said frame may be secured to the dash board, means for removably securing the parts of the cage or frame together, a power or driving shaft mounted in the fixed part of said cage or frame, a gear secured to said shaft, a driven shaft mounted in the other part of said cage or frame in juxtaposition to the driving shaft, a gear secured to said driven shaft, an idler shaft, the ends of which are supported respectively in the parts of said cage or frame, and idler gears secured to said idler shaft, the said idler gears engaging respectively with the gear of the driving shaft and the gear of the driven shaft.

5. In a steering gear for automobiles, a frame, a plurality of shafts mounted in said frame, gears mounted on each of said shafts for operative engagement one with the other, means for drawing together the separate portions of the frame in which the parallel shafts are mounted to adjust engagement of the gears.

6. In a steering gear for automobiles, a shaft, a gear keyed to said shaft, means for adjusting the grip of said gear upon said shaft, means consisting of a collar engaging the shaft and gear for holding said gear from longitudinal movement on said shaft.

7. In a steering gear for automobiles, an open frame having two oppositely disposed sides each of which carries a bearing, a second frame having two oppositely disposed sides, each of which carries a bearing, means for drawing the sides and bearings of a frame toward one another, means for securing said frames together, means for supporting one of said frames from a part of the automobile, a shaft supported in one of the bearings of one of said frames, a gear secured to said shaft, a second shaft support in one of the bearings of the other of said frames, a gear secured to said second shaft, an idler shaft, the ends of which are supported one in each of the other of the bearings of said frames and two gears secured to said idler shaft and with which the gears respectively carried by said two first mentioned shafts are in operative engagement.

In witness whereof we have hereunto set our hands at the borough of Manhattan, city and State of New York, this 12th day of December, 1914.

ARTHUR C. MASON.
ALFRED T. STURT.

In presence of—
FRED W. HOHENSEE,
JOHN J. RANAGAN.